United States Patent
Raghavan et al.

(10) Patent No.: US 9,651,131 B2
(45) Date of Patent: May 16, 2017

(54) CLUTCH SYSTEM CONFIGURED TO ENHANCE ENGAGEMENT PERFORMANCE OF CLUTCH TEETH

(71) Applicant: American Axle & Manufacturing, Inc., Detroit, MI (US)

(72) Inventors: Satyanarayanan Raghavan, Novi, MI (US); William Wang, Troy, MI (US); David Crecelius, Cicero, IN (US)

(73) Assignee: American Axle & Manufacturing, Inc., Detroit, MI (US)

( * ) Notice: Subject to any disclaimer, the term of this patent is extended or adjusted under 35 U.S.C. 154(b) by 67 days.

(21) Appl. No.: 14/851,670

(22) Filed: Sep. 11, 2015

(65) Prior Publication Data

US 2017/0074380 A1   Mar. 16, 2017

(51) Int. Cl.
 *F16H 48/24*  (2006.01)
 *F16H 48/20*  (2012.01)

(52) U.S. Cl.
 CPC ... *F16H 48/24* (2013.01); *F16D 2500/10462* (2013.01); *F16H 2048/204* (2013.01)

(58) Field of Classification Search
 CPC .............. F16H 48/24; F16H 2048/204; F16D 2500/10462; F16D 2500/10425
 See application file for complete search history.

(56) References Cited

U.S. PATENT DOCUMENTS

| | | | | |
|---|---|---|---|---|
| 3,460,656 A | * | 8/1969 | Swanson | F16D 48/062 192/48.5 |
| 3,973,450 A | * | 8/1976 | Shealy | F16H 48/08 475/119 |
| 5,335,764 A | * | 8/1994 | Leitner | B60K 17/3505 192/103 F |
| 5,465,819 A | * | 11/1995 | Weilant | B60K 17/20 192/35 |
| 5,827,148 A | | 10/1998 | Seto et al. | |
| 6,083,134 A | | 7/2000 | Godlew | |
| 6,460,677 B1 | | 10/2002 | Roscoe | |
| 6,601,668 B2 | | 8/2003 | Kitai et al. | |
| 6,769,523 B2 | | 8/2004 | Muetzel et al. | |
| 6,958,030 B2 | | 10/2005 | DeGowske | |

(Continued)

FOREIGN PATENT DOCUMENTS

| | | |
|---|---|---|
| DE | 102005057803 A1 | 6/2007 |
| FR | 2901334 A1 | 11/2007 |

*Primary Examiner* — Sherry Estremsky
(74) *Attorney, Agent, or Firm* — Harness, Dickey & Pierce, P.L.C.

(57) ABSTRACT

A locking differential can include first and second locking dogs and an actuator system. The first dog can include a set of first teeth fixed to a side gear of the differential. The second dog can be axially movable between first and second positions and can include an annular body coupled to a differential case for common rotation and a set of second teeth. In the first position, the first and second teeth can be disengaged. In the second position, the first and second teeth can be engaged, inhibiting relative rotation between the side gear and the differential case. At least one sensor can detect the angular position and angular velocity of the second teeth relative to the first teeth. An actuator can move the second dog from the first position to the second position based on the detected relative angular positions and velocities of the first and second teeth.

20 Claims, 6 Drawing Sheets

(56) References Cited

U.S. PATENT DOCUMENTS

| | | |
|---|---|---|
| 7,211,020 B2 | 5/2007 | Gohl et al |
| 7,325,664 B2 | 2/2008 | Fusegi |
| 7,399,248 B2 | 7/2008 | Kleinhans et al. |
| 7,425,185 B2 | 9/2008 | Donofrio et al. |
| 7,729,839 B2 | 6/2010 | Claussen et al. |
| 8,647,237 B2 * | 2/2014 | Prix .................. B60K 23/00 477/181 |
| 9,140,349 B1 | 9/2015 | Marsh et al. |

* cited by examiner

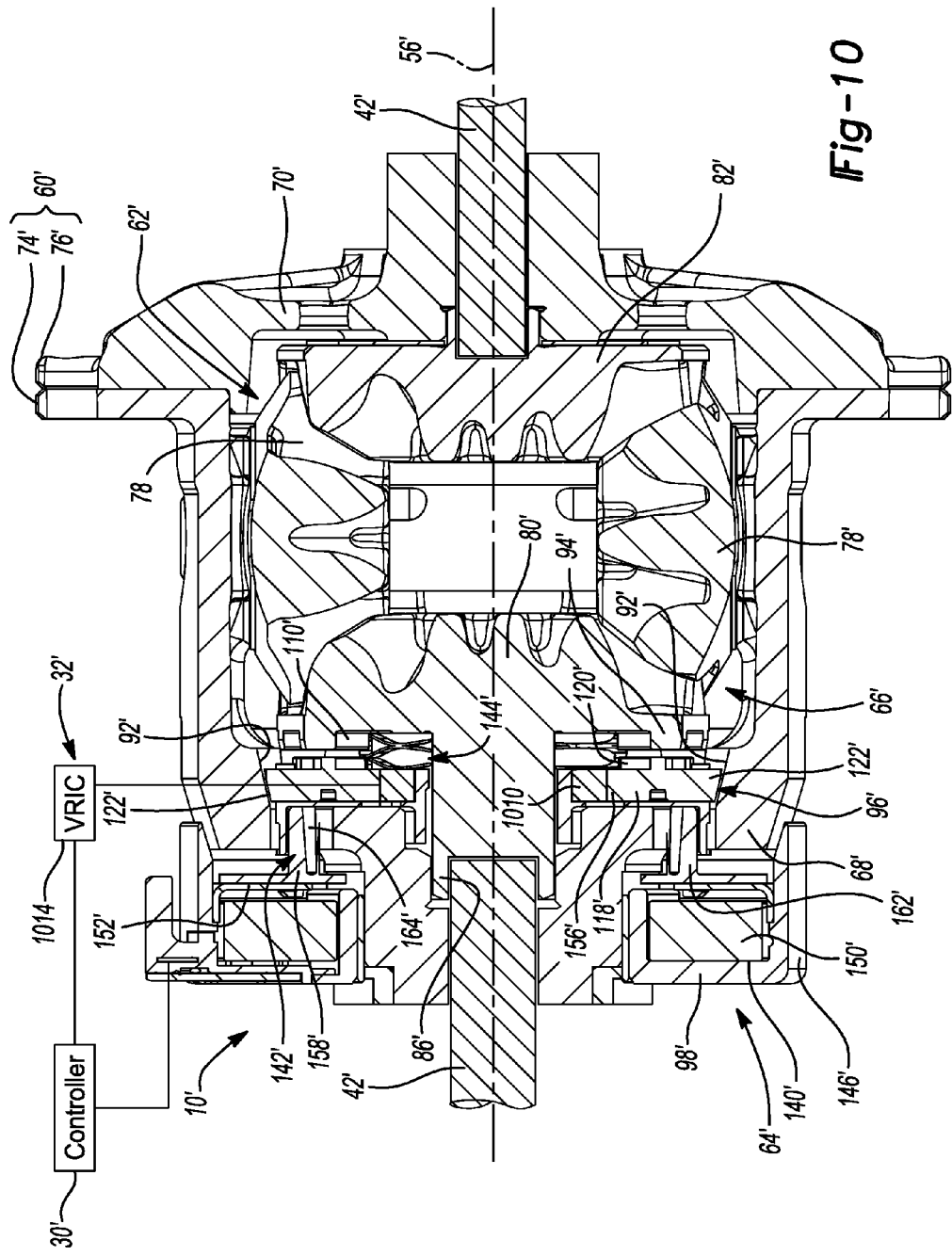

CLUTCH SYSTEM CONFIGURED TO ENHANCE ENGAGEMENT PERFORMANCE OF CLUTCH TEETH

FIELD

The present disclosure relates to a clutch system configured to enhance engagement performance of clutch teeth.

BACKGROUND

This section provides background information related to the present disclosure which is not necessarily prior art.

Dog clutches are used in a variety of applications (e.g. vehicle drivetrains) and generally include an input member and an output member that each have a set of teeth. Typically, either the input member or the output member is movable relative to the other such that the teeth of the input and output members can be selectively meshingly engaged to transmit rotary power between the input and output members. A linear actuator moves either the input or output member linearly along a common rotational axis of the input and output members until the teeth meshingly engage. The relative rotational speeds and angular alignments of the input and output members can cause their respective teeth to contact each other before the teeth are fully meshed. This can result in additional wear on the teeth and other components attached to the input and output members. This can also result in increased noise, vibration, and harshness of the clutched device.

A non-limiting example of a dog clutch application is a locking differential assembly. Differential assemblies are known in the art for transmitting rotary power from a power train to a pair of vehicle wheels. Typically, a differential assembly includes a differential case and a differential gearset with a pair of side gears that are driven by the differential case. A locking differential assembly is configured to selectively lock one or both of the output side gears of the differential gearset to the differential case for common rotation about a rotary axis. Typically, the locking differential assembly includes a locking dog that is non-rotatably but slidably mounted to the differential case so as to be movable into a position where it engages teeth on one of the side gears so as to inhibit rotation of the side gear relative to the differential case. While this configuration is well suited for its intended purpose, this type of locking differential assembly is nevertheless susceptible to improvement.

SUMMARY

This section provides a general summary of the disclosure, and is not a comprehensive disclosure of its full scope or all of its features.

In one form, the present disclosure provides for a locking differential assembly including a differential case, a differential gearset, and a locking mechanism. The differential case can define a cavity. The differential case can be configured to rotate about an axis. The differential gearset can be received in the cavity. The differential gearset can have a first side gear that can be configured to rotate about the axis. The locking mechanism can selectively lock the first side gear to the differential case for common rotation about the axis. The locking mechanism can include a first locking dog, a second locking dog and an actuator system. The first locking dog can include a set of first dog teeth that can be fixedly coupled to the first side gear. The second locking dog can include an annular body and a set of second dog teeth. The annular body can be coupled to the differential case for common rotation about the axis. The set of second dog teeth can extend from the annular body. The second locking dog can be movable along the axis between a first position, in which the set of second dog teeth can be disengaged from the set of first dog teeth to permit relative rotation between the first side gear and the differential case, and a second position in which the set of second dog teeth can be engaged with the set of first dog teeth to inhibit relative rotation between the first side gear and the differential case. The actuator system can include at least one sensor and an actuator. The at least one sensor being configured to detect the angular position and angular velocity of the second dog teeth relative to the first dog teeth. The actuator being configured to move the second locking dog from the first position to the second position based on the detected relative angular positions and relative angular velocities of the first and second dog teeth.

In another form, the present disclosure provides for a method for operating a locking differential assembly. The method can include detecting a position and rotational speed of a set of first dog teeth of a first locking dog that can be coupled for common rotation with a side gear of the locking differential assembly. The method can include detecting a position and rotational speed of a set of second dog teeth of a second locking dog that can be coupled for common rotation with a differential case of the locking differential assembly. The method can include determining if the second dog teeth are within a predetermined rotational zone relative to the first dog teeth. The method can include moving the second locking dog axially until the first and second dog teeth are engaged in response to the second dog teeth being detected within the predetermined rotational zone.

In another form, the present disclosure provides for an axle assembly including an axle housing, a differential assembly, a pair of axle shafts, and an actuator system. The differential assembly can be housed in the axle housing and rotatable about a rotary axis. The differential assembly can include a differential case defining a cavity; a differential gearset, a first locking dog, and a second locking dog. The differential gearset can be received in the cavity. The differential gearset can have a first side gear. The first locking dog can include a set of first dog teeth that can be fixedly coupled to the first side gear. The second locking dog can include an annular body and a set of second dog teeth. The annular body can be coupled to the differential case for common rotation about the rotary axis. The set of second dog teeth can extend from the annular body. The second locking dog can be movable along the rotary axis between a first position, in which the set of second dog teeth can be disengaged from the set of first dog teeth to permit relative rotation between the first side gear and the differential case, and a second position in which the set of second dog teeth can be engaged with the set of first dog teeth to inhibit relative rotation between the first side gear and the differential case. The pair of axle shafts can be driven by the differential assembly. The actuator system can include at least one sensor and an actuator. The at least one sensor can be configured to detect the angular position and angular velocity of the second dog teeth relative to the first dog teeth. The actuator can be configured to move the second locking dog from the first position to the second position based on the detected relative angular positions and relative angular velocities of the first and second dog teeth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a longitudinal sectional view similar to FIG. 4, illustrating a locking differential assembly of a second construction.

Corresponding reference numerals indicate corresponding parts throughout the several views of the drawings.

DETAILED DESCRIPTION

Example embodiments will now be described more fully with reference to the accompanying drawings.

Figure 1:
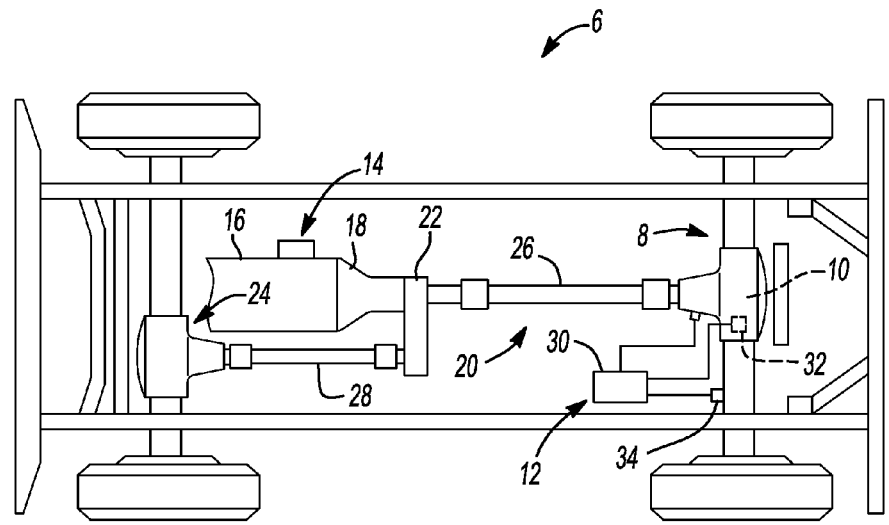
FIG. 1 is a schematic illustration of a vehicle having a rear axle assembly with an exemplary locking differential assembly constructed in accordance with the teachings of the present disclosure.

With reference to FIG. 1 of the drawings, a vehicle 6 is schematically illustrated as having a rear axle assembly 8 with a locking differential assembly 10 constructed in accordance with the teachings of the present disclosure. The vehicle 6 is a four-wheel drive vehicle having a control system 12, powertrain 14 with an engine 16 and a transmission 18 that provide rotary power to a drivetrain 20 having a transfer case 22, the rear axle assembly 8 and a front axle assembly 24. Rotary power can be transmitted from the transfer case 22 to the rear axle assembly 8 and the front axle assembly 24 via rear and front propshafts 26 and 28, respectively. The configuration of the front axle assembly 24 can be generally similar to that of the rear axle assembly 8 and as such, a discussion of the rear axle assembly 8 will suffice for the front axle assembly 24. The control system 12 can include a control module 30, a first sensor 32, and a second sensor 34. The control module 30 can be any suitable type of controller configured to receive inputs from the first and second sensors 32, 34 and to control operation of the locking differential assembly 10 as described below. The first and second sensors 32, 34 can be coupled to or disposed within the rear axle assembly 8 as described below and can be electrically coupled to the control module 30.

Figure 2:
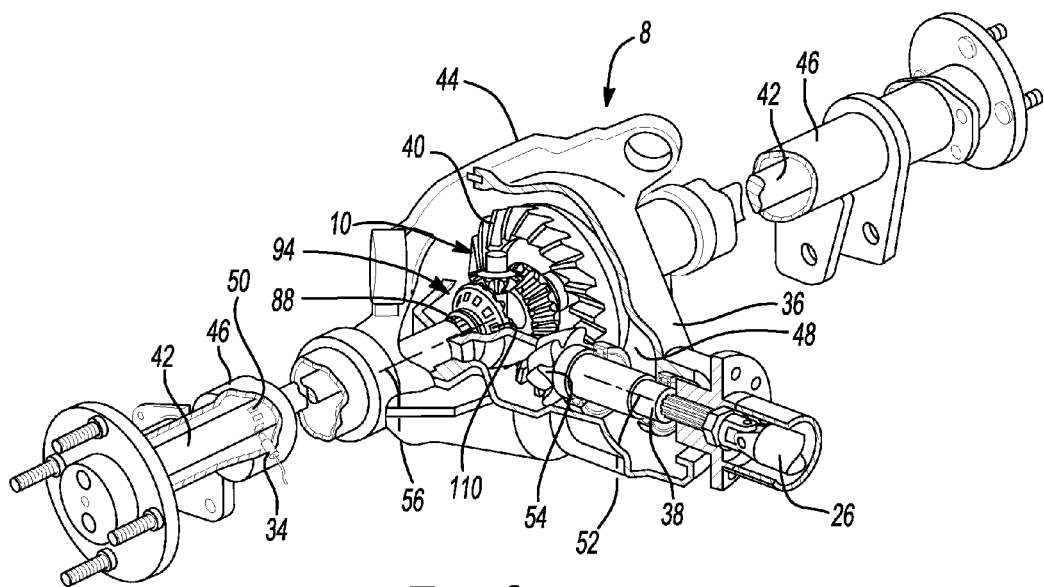
FIG. 2 is a perspective view of the rear axle assembly of FIG. 1.

In FIG. 2, the rear axle assembly 8 is illustrated as including an axle housing assembly 36, an input pinion 38, a ring gear 40, the locking differential assembly 10, and a pair of axle shafts 42. The axle housing assembly 36 can be any type of housing assembly, such as a Banjo-type axle housing assembly, but in the particular example provided, the axle housing assembly 36 is a Salisbury-type axle housing assembly having a carrier housing 44 and a pair of axle tubes 46 that are coupled to the carrier housing 44 in a conventional and well known manner. The carrier housing 44 can define a cavity 48 into which the locking differential assembly 10 is received.

The axle shafts 42 can be coaxially received through the axle tubes 46. The axle shafts 42 can extend into the cavity 48 and be drivingly coupled to the locking differential assembly 10 as described below to receive rotary power therefrom. In the example provided, the axle shafts 36 include a plurality of indexed second sensor targets 50 which can be splines or teeth disposed about the circumference of the axle shaft 36. The second sensor 34 can be mounted to the axle tube 46 at a location that aligns with the second sensor targets 50. In the example provided, the second sensor 34 can penetrate into an interior of the axle tube 46. The second sensor 34 can be configured to detect the rotational velocity and rotational position of the axle shaft 42 by detecting the second sensor targets 50. The second sensor 34 can detect the second sensor targets 50 in any suitable manner, such as by physically contacting the second sensor targets 50, or by proximity or magnetic fields for example. In the example provided, the second sensor 34 is a Hall Effect sensor.

The input pinion 38 can be mounted to the carrier housing 44 for rotation about a first axis 52. The input pinion 38 can be coupled for rotation with the rear propshaft 26 and can include a pinion gear 54 that can be disposed in the cavity 48. The ring gear 40 can be received in the cavity 48 and rotatable about a second axis 56 that can be transverse or generally perpendicular to the first axis 52. The ring gear 40 can be meshingly engaged to the pinion gear 54.

Figure 3:
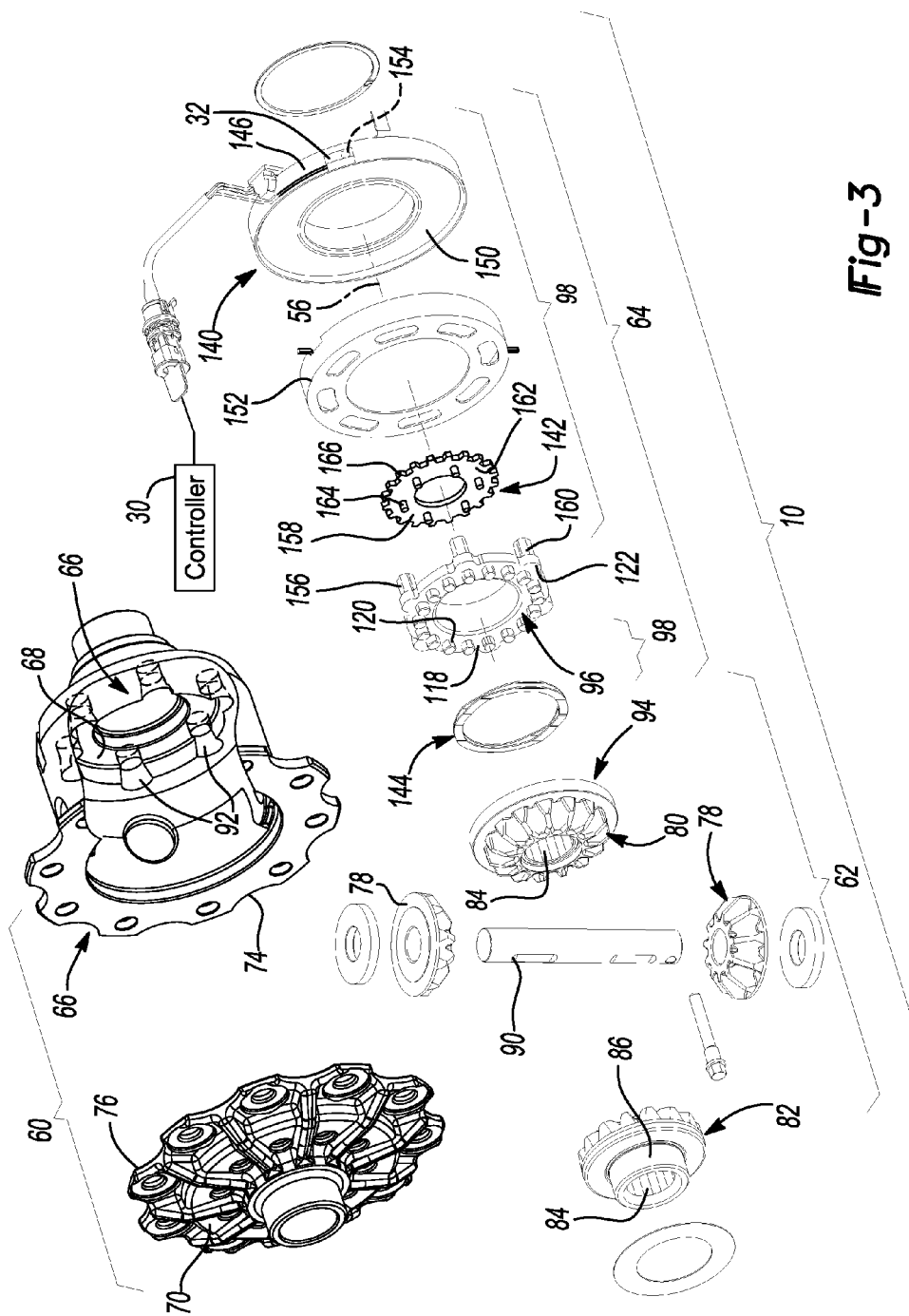
FIG. 3 is an exploded perspective view of a portion of the rear axle assembly, illustrating the locking differential assembly in more detail.

With additional reference to FIG. 3, the locking differential assembly 10 can include a differential case 60, a differential gearset 62, and a clutch or locking mechanism 64. The differential case 60 can be formed as one or more discrete components and can define a differential cavity 66 that can be bounded on opposite sides by first and second end walls 68 and 70, respectively. In the particular example provided, the differential case 60 is an assembly that is formed of first and second case members 74 and 76 that are bolted to one another and the ring gear 40.

The differential case 60 can be mounted to the axle housing assembly 36 for rotation about a second axis 56, which can be transverse or perpendicular to the first axis 52. The differential gearset 62 can be any type of gearset that can receive rotary power from the differential case 60 and output rotary power to the axle shafts 42. In the particular example provided, the differential gearset 62 comprises bevel gearing (i.e., two or more bevel pinions 78 that are meshingly engaged with first and second (bevel) side gears 80 and 82), but it will be appreciated that other types of gear arrangements, such as spur or helical gear arrangements, could be employed in the alternative.

The differential gearset 62 can include a pair of output members, i.e., the first and second side gears 80 and 82, which can be drivingly coupled to the axle shafts 42 in a conventional manner. In the example provided, the first and second side gears 80 and 82 each have a set of interior splined surfaces 84 that are disposed about the second axis 56 and about an interior of an output portion 86 of the side gears 80, 82. The interior splined surfaces 84 are meshingly engaged with a mating external splined surface 88 formed on a corresponding axle shaft 42. In the example provided, the bevel pinions 78 are rotatably mounted within the differential cavity 66 to a center pin 90 that is coupled to the differential case 60 and transverse or perpendicular to the second axis 56.

Figure 4:
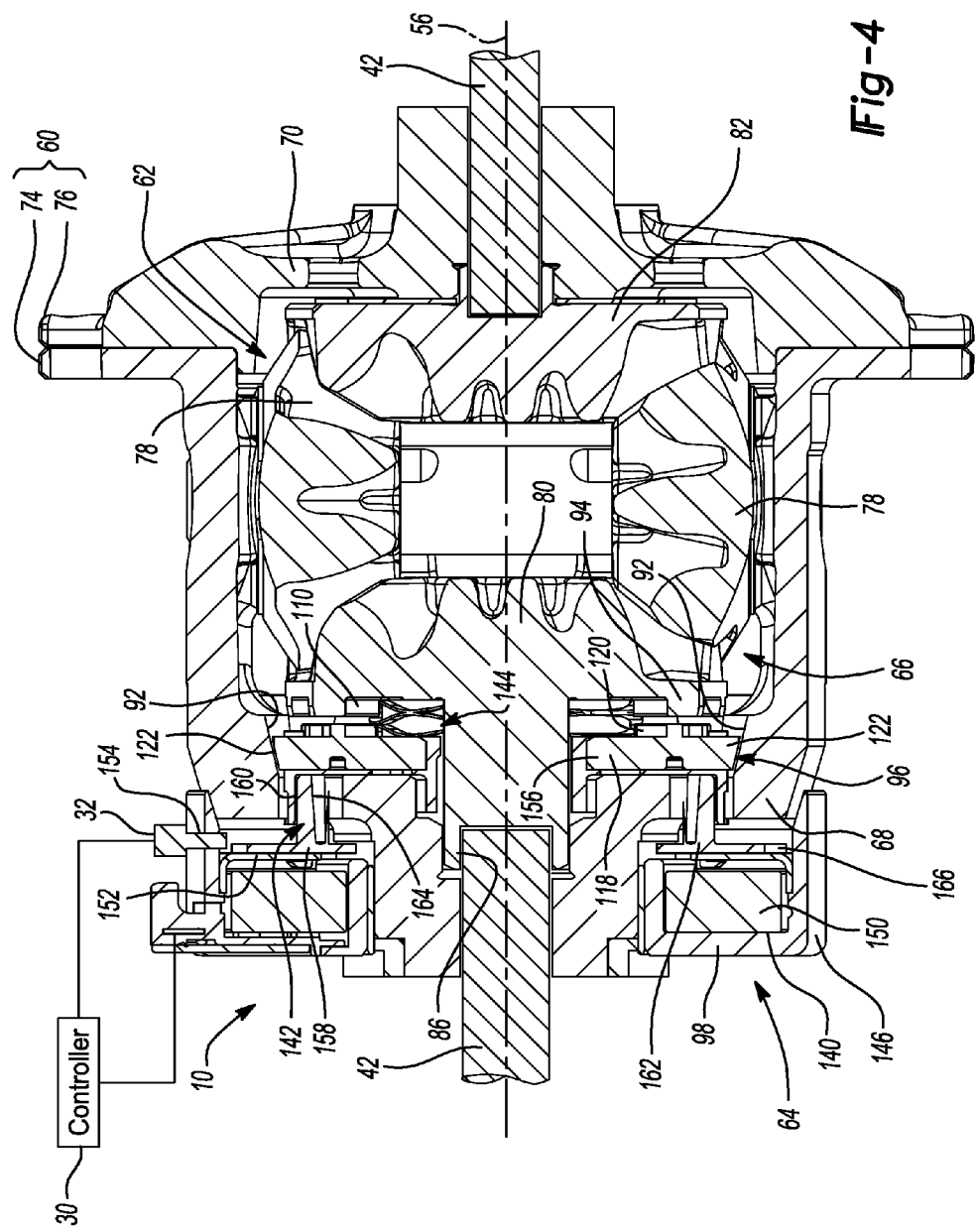
FIG. 4 is a longitudinal section view of the locking differential assembly.

With reference to FIGS. 3 and 4, the locking mechanism 64 can comprise a plurality of lock apertures 92, a first locking dog 94, a second locking dog 96 and an actuator 98. The first locking dog 94 comprises a set of first dog teeth 110 that are fixedly coupled to the first side gear 80. The first dog teeth 110 can be disposed on an outboard lateral side of the first side gear 80 and can be spaced circumferentially about the second axis 56. The number of first dog teeth 110 can be equal to the number of second sensor targets 50 and the circumferential location of the second sensor targets 50 can correspond to or be indexed to the circumferential location of the first dog teeth 110. In this way, the position or boundaries of the second sensor targets 50, sensed by the second sensor 34, corresponds to the angular position or boundaries of the first dog teeth 110.

The second locking dog 96 can have an annular body 118, a set of second dog teeth 120 and a plurality of locking tabs 122. The set of second dog teeth 120 can extend from the annular body 118 and can be configured to be engaged with the set of first dog teeth 110 to inhibit relative rotation between the first and second locking dogs 94 and 96. The locking tabs 122 can be fixedly coupled to the annular body 118 and can extend radially outwardly therefrom. Each of the locking tabs 122 can be received in a corresponding one of the lock apertures 92. The locking tabs 122 and the lock apertures 92 can cooperate to limit rotation of the second locking dog 96 relative to the differential case 60, while permitting movement of the second locking dog 96 along the second axis 56 relative to the differential case 60. The second locking dog 96 can be movable along the second axis 56 between a first position and a second position. When the second locking dog 96 is in the first position, the set of second dog teeth 120 is disengaged from the set of first dog teeth 110 to permit relative rotation between the first side gear 80 and the differential case 60. When the second locking dog 96 is in the second position, the set of second dog teeth 120 is engaged with the set of first dog teeth 110 to inhibit relative rotation between the first side gear 80 and the differential case 60.

The actuator 98 can be any type of device that can be employed to selectively translate the second locking dog 96 along the second axis 56. Actuators for translating a component of a locking mechanism relative to a differential case are well known in the art and include, among others, actuators found in U.S. Pat. Nos. 6,083,134, 6,460,677, 6,958,030, 7,211,020, 7,325,664, 7,399,248 and 7,425,185. In the particular example provided, the actuator 98 comprises an annular solenoid 140, a thrust plate 142, and a return spring 144.

The annular solenoid 140 can be mounted on the differential case 60 in a manner that permits rotation of the differential case 60 relative to the annular solenoid 140 but which limits movement of the annular solenoid 140 along the second axis 56 in a direction away from the second locking dog 96. The annular solenoid 140 can include a housing 146, an electromagnetic coil 150 and an annular plunger 152. The electromagnetic coil 150 and annular plunger 152 can be located within the housing 146. The housing 146 can define a sensor aperture 154.

The first sensor 32 can be mounted to the exterior of the housing 146 and can be received in the sensor aperture 154 to extend radially inward from the exterior of the housing 146. The annular plunger 152 can be selectively moved along the second axis 56 in response to energization of the electromagnetic coil 150. The electromagnetic coil 150 can be electrically coupled to the control module 30 and operation of the electromagnetic coil 150 can be controlled by the control module 30 such that the control module 30 can control when the electromagnetic coil 150 is energized.

The thrust plate 142 can be fixedly coupled to the second locking dog 96. In the particular example provided, the thrust plate 142 includes a first portion 156 that is formed of a plastic material that is overmolded (i.e., cohesively bonded) to the second locking dog 96 and a second portion 158 that is separately formed and coupled to the first portion 156. The first portion 156 can include a plurality of first legs 160 that can extend from the second locking dog 96 on a side opposite the set of second dog teeth 120. Each of the first legs 160 can extend into an associated one of the lock apertures 92 and can abut a corresponding one of the locking tabs 122.

The second portion 158 can include an annular body 162, a plurality of second legs 164 and a plurality of first sensor targets 166. The annular body 162 and the second locking dog 96 can be located on opposite sides of the first end wall 68. The annular body 162 can be located within the housing 146 of the annular solenoid 140 and can abut the annular plunger 152.

The number of second legs 164 can be equal to the number of the first legs 160 and the second legs 164 can extend from the annular body 162 on a side toward the first legs 160. The second legs 164 can be fixedly coupled to the first legs 160. In the example provided, the first legs 160 are hollow and the second legs 164 are received within and affixed to the first legs 160, though other configurations can be used. The first and second legs 160, 164 can be affixed by any suitable manner such fasteners, latches, adhesives, or welding for example.

The first sensor targets 166 can be splines or teeth that extend radially outward from the annular body 162 and can be spaced circumferentially about the outer perimeter of the annular body 162. The number of the first sensor targets 166 can be equal to the number of second dog teeth 120. The circumferential location of each first sensor target 166 can correspond to or be indexed to the location of one of the second dog teeth 120. The first sensor targets 166 can be axially located such that the angular position and boundaries of each first sensor target 166 can be detected by the first sensor 32 when that first sensor target 166 approaches the first sensor 32. In this way, the position or boundaries of the first sensor targets 166, sensed by the first sensor 32, corresponds to the angular position or boundaries of the second dog teeth 120. Thus, the first sensor 32 can detect the angular or rotational position and the rotational velocity of the second dog teeth 120.

The return spring 144 can be configured to bias the second locking dog 96 away from the first locking dog 94 so that the set of second dog teeth 120 are normally disengaged from the set of first dog teeth 110. In the particular example provided, the return spring 144 is disposed between the first and second locking dogs 94 and 96.

The locking differential assembly 10 can be operated in a first mode, in which the actuator 98 places the second locking dog 96 in the first position so that the set of second dog teeth 120 are disengaged from the set of first dog teeth 110. In this mode, the first side gear 80 is permitted to rotate relative to the differential case 60 so that the locking differential assembly 10 operates as an open differential that permits speed differentiation between the first and second side gears 80 and 82.

The locking differential assembly 10 can also be operated in a second mode, in which the actuator 98 places the second locking dog 96 in the second position so that the set of second dog teeth 120 are engaged to the set of first dog teeth 110. In this mode, the first side gear 80 is locked to the differential case 60 for common rotation so that the locking differential assembly 10 operated as a locked differential that does not permit speed differentiation between the first and second side gears 80 and 82.

In operation, the return spring 144 can bias the second locking dog 96 such that the locking differential assembly 10 is normally in the first mode. When locking of the locking differential assembly 10 is desired, the control module 30 can generally energize the electromagnetic coil 150 to drive the annular plunger 152 axially toward the first side gear 80. The annular plunger 152 pushes the thrust plate 142 axially toward the first side gear 80 until the first and second dog teeth 110, 120 engage.

Figure 5:
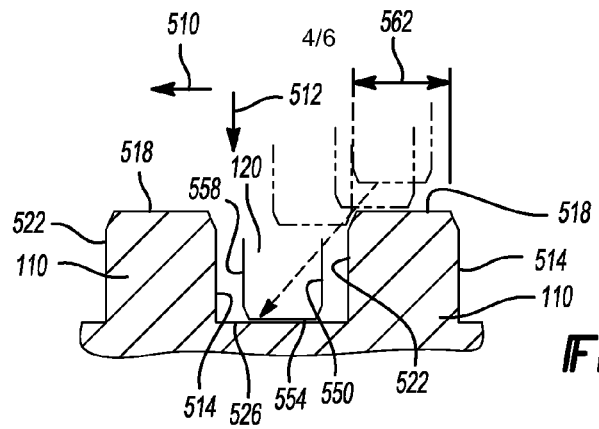
FIG. 5 is a schematic illustration of clutch teeth of the locking differential assembly engaging in a first engagement type.

With additional reference to FIG. 5, a schematic illustration of the first and second dog teeth 110, 120 engaging in a first engagement type is shown. The second dog teeth 120 can have a rotational velocity about the second axis 56 (FIGS. 2-4) in the direction 510 relative to the rotational velocity of the first dog teeth 110. The thrust plate 142 (FIGS. 3 and 4) is configured to impart a force in direction 512 (i.e. along the second axis 56 shown in FIGS. 3 and 4) as described above. It is understood that the relative angular positions of the first and second dog teeth 110, 120 that result in engagement in the first engagement type depends on the relative rotational velocity of the first and second locking dogs 94, 96 and the speed at which the actuator 98 can move the second locking dog 96 in the direction 512.

Each of the first dog teeth 110 can generally have a first face 514, a second face 518, and a third face 522. The first and third faces 514, 522 are side faces of the first dog teeth 110 and the second face 518 is an end face of the first dog teeth 110. Adjacent first dog teeth 110 can define a valley 526 between the first face 514 of one of the first dog teeth 110 and the third face 522 of the adjacent one of the first dog teeth 110. In the example provided, the first and third faces 514, 522 extend axially outward from the first side gear 80 parallel relative to each other and are perpendicular to the second face 518, though other configurations can be used.

Each of the second dog teeth 120 can generally have a fourth face 550, fifth face 554, and a sixth face 558. The fourth and sixth faces 550, 558 are side faces of the second dog teeth 120 and the fifth face 554 is an end face of the second dog teeth 120. While only one of the second dog teeth 120 is shown in FIG. 5 for illustration purposes, it is understood that adjacent ones of the second dog teeth 120 form a valley between the fourth face 550 of one of the second dog teeth 120 and the sixth face 558 of the adjacent one of the second dog teeth 120. In the example provided, the fourth and sixth faces 550, 558 extend axially outward from the annular body 118 parallel relative to each other and are perpendicular to the fifth face 554, though other configurations can be used. In the example provided, the first and third faces 514, 522 are parallel to the fourth and sixth faces 550, 558. In the example provided, the second and fifth faces 518, 554 are parallel to each other.

When engaging in the first engagement type, the electromagnetic coil 150 is energized when the first and second dog teeth 110, 120 have a relative angular position and relative rotational velocity such that the force from the thrust plate 142 in the direction 512 causes the fifth face 554 to contact and slide on the second face 518 until the second dog teeth 120 align with the valleys 526. Once the second dog teeth 120 align with the valleys 526, the second dog teeth 120 can enter the valleys 526 and continue moving axially until the fifth face 554 contacts the bottom of the valleys 526. In the first engagement type, the fifth face 554 can contact the bottom of the valleys 526 before the sixth face 558 reaches the first face 514, such that the fifth face 554 slides along the bottom of the valley 526 until the first and sixth faces 514, 558 engage.

The control module 30 (FIGS. 1-4) can be configured to use predetermined or stored look-up tables of various relative rotational velocities, relative angular positions, and the speed at which the second locking dog 96 can move in direction 512 to determine if the first and second dog teeth 110, 120 are in a first zone 562 wherein they will engage in the first engagement type. In the example provided, the first zone 562 is the angular position relative to the first dog teeth 110 wherein a leading edge (i.e. third face 558) of the second dog teeth 120 can be a predetermined angular position or distance relative to a leading edge (i.e. third face 522) of the first dog teeth 110, for a particular relative angular velocity. It is understood that the control module 30 can use other methods of determining if the first and second dog teeth 110, 120 are in the first zone 562 besides a look-up table, such as calculating the relative positions based on equations for example.

Figure 6:
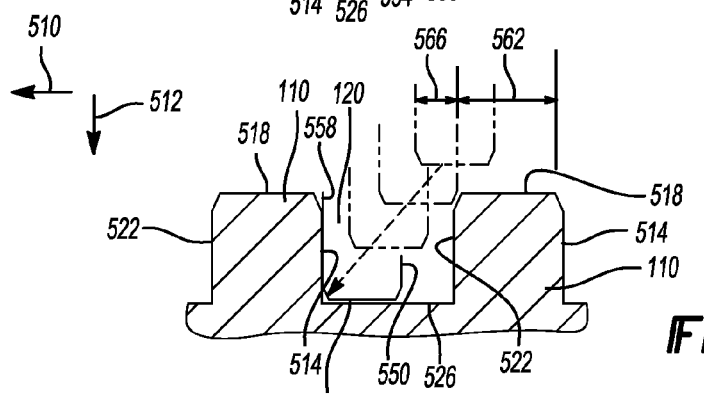
FIG. 6 is a schematic illustration of clutch teeth of the locking differential assembly engaging in a second engagement type.

With additional reference to FIG. 6, a schematic illustration of the first and second dog teeth 110, 120 engaging in a second engagement type is shown. Engaging in the second engagement type is similar to engaging in the first engagement type except as otherwise shown or described herein. When engaging in the second engagement type, the electromagnetic coil 150 is energized when the first and second dog teeth 110, 120 have a relative angular position and relative rotational velocity such that the force from the thrust plate 142 in the direction 512 causes the second dog teeth 120 to directly enter the valleys 526 without the second and fifth faces 518, 554 contacting, such that the fifth face 554 slides along the bottom of the valley 526 until the first and sixth faces 514, 558 engage. It is understood that the relative angular positions of the first and second dog teeth 110, 120 that result in engagement in the second engagement type depends on the relative rotational velocity of the first and second locking dogs 94, 96 and the speed at which the actuator 98 can move the second locking dog 96 in the direction 512.

The control module 30 (FIGS. 1-4) can be configured to use predetermined or stored look-up tables of various relative rotational velocities, relative angular positions, and the speed at which the second locking dog 96 can move in direction 512 to determine if the first and second dog teeth 110, 120 are in a second zone 566 wherein they will engage in the second engagement type. In the example provided, the second zone 566 is the angular position relative to the first dog teeth 110 wherein the leading edge (i.e. third face 558) of the second dog teeth 120 can be a predetermined angular position or distance relative to the leading edge (i.e. third face 522) of the first dog teeth 110, for a particular relative angular velocity. It is understood that the control module 30 can use other methods of determining if the first and second dog teeth 110, 120 are in the second zone 566 besides a look-up table, such as calculating the relative positions based on equations for example.

Figure 7:
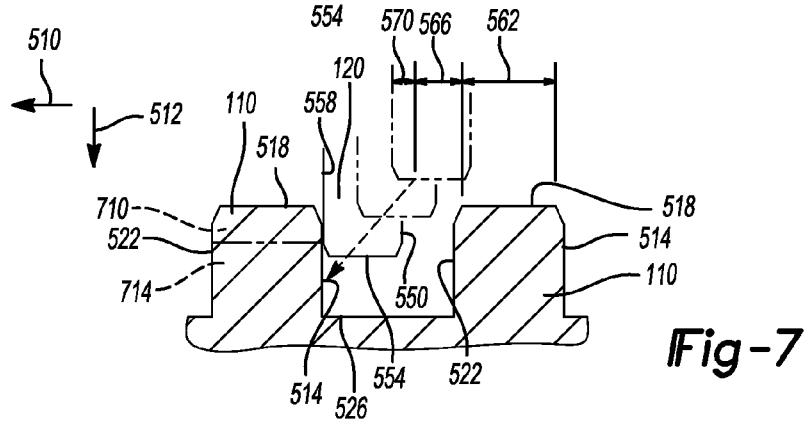
FIG. 7 is a schematic illustration of clutch teeth of the locking differential assembly engaging in a third engagement type.

With additional reference to FIG. 7, a schematic illustration of the first and second dog teeth 110, 120 engaging in a third engagement type is shown. Engaging in the third engagement type is similar to engaging in the second engagement type except as otherwise shown or described herein. When engaging in the third engagement type, the electromagnetic coil 150 is energized when the first and second dog teeth 110, 120 have a relative angular position and relative rotational velocity such that the force from the thrust plate 142 in the direction 512 causes the second dog teeth 120 to directly enter the valleys 526 without the second and fifth faces 518, 554 contacting. In the third engagement type, the sixth face 558 contacts the first face 514 before the fifth face 554 contacts the bottom of the valley 526. When engaging in the third engagement type, the impact of the second dog teeth 120 on the first dog teeth 110 can result in damage to the first and/or second dog teeth 110, 120. It is understood that the relative angular positions of the first and second dog teeth 110, 120 that result in engagement in the third engagement type depends on the relative rotational velocity of the first and second locking dogs 94, 96 and the speed at which the actuator 98 can move the second locking dog 96 in the direction 512.

In the example provided, the first dog teeth 110 are divided into two sections, with a first section 710 proximate to the second surface 518 and a second section 714 proximate to the bottom of the valley 526. In the example provided, the first section 710 is a smaller portion of the first dog teeth 110 than the second section 714. The exact proportions of the first and second sections 710, 714 can generally depend on the tooth configuration, speed, and torque conditions of the first and second dog teeth 110, 120.

In the example provided of the third engagement type, the sixth face 558 contacts the first face 514 when the fifth face 554 is aligned within the second section 714. After the sixth surface 558 contacts the first surface 514, the second dog tooth 120 can continue to move down in the valley 526, with the sixth surface 558 sliding along the first surface 514 until the fifth surface 554 contacts the bottom of the valley 526.

The control module 30 (FIGS. 1-4) can be configured to use predetermined or stored look-up tables of various relative rotational velocities, relative angular positions, and the speed at which the second locking dog 96 can move in direction 512 to determine if the first and second dog teeth 110, 120 are in a third zone 570 wherein they will engage in the third engagement type. In the example provided, the third zone 570 is the angular position relative to the first dog teeth 110 wherein the leading edge (i.e. third face 558) of the second dog teeth 120 can be a predetermined angular position or distance relative to the leading edge (i.e. third face 522) of the first dog teeth 110, for a particular relative angular velocity. It is understood that the control module 30 can use other methods of determining if the first and second dog teeth 110, 120 are in the third zone 570 besides a look-up table, such as calculating the relative positions based on equations for example.

Figure 8:
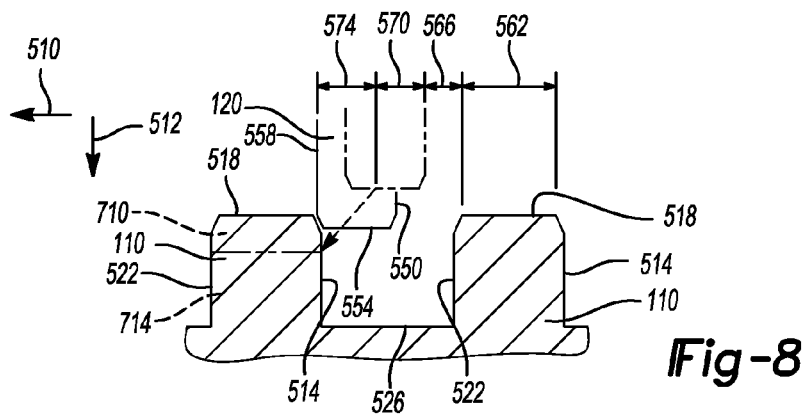
FIG. 8 is a schematic illustration of clutch teeth of the locking differential assembly engaging in a fourth engagement type.

With additional reference to FIG. 8, a schematic illustration of the first and second dog teeth 110, 120 engaging in a fourth engagement type is shown. Engaging in the fourth engagement type is similar to engaging in the third engagement type except as otherwise shown or described herein. When engaging in the fourth engagement type, the electromagnetic coil 150 is energized when the first and second dog teeth 110, 120 have a relative angular position and relative rotational velocity such that the force from the thrust plate 142 in the direction 512 causes the second dog teeth 120 to directly enter the valleys 526 without the second and fifth faces 518, 554 contacting. In the fourth engagement type, the sixth face 558 contacts the first face 514 before the fifth face 554 contacts the bottom of the valley 526. It is understood that the relative angular positions of the first and second dog teeth 110, 120 that result in engagement in the fourth engagement type depends on the relative rotational velocity of the first and second locking dogs 94, 96 and the speed at which the actuator 98 can move the second locking dog 96 in the direction 512.

In the example provided of the fourth engagement type, the sixth face 558 contacts the first face 514 when the fifth face 554 is aligned within the first section 710. When engaging in the fourth engagement type, the impact of the second dog teeth 120 on the first dog teeth 110 can result in damage to the first and/or second dog teeth 110, 120. The impact can also cause the second dog teeth 120 to be kicked out of the valleys 526, which can result in a missed engagement event wherein the second dog teeth 120 must rebound back toward the first dog teeth 110 to attempt to enter an adjacent one of the valleys 526.

The control module 30 (FIGS. 1-4) can be configured to use predetermined or stored look-up tables of various relative rotational velocities, relative angular positions, and the speed at which the second locking dog 96 can move in direction 512 to determine if the first and second dog teeth 110, 120 are in a fourth zone 574 wherein they will engage in the fourth engagement type. In the example provided, the fourth zone 574 is the angular position relative to the first dog teeth 110 wherein the leading edge (i.e. third face 558) of the second dog teeth 120 can be a predetermined angular position or distance relative to the leading edge (i.e. third face 522) of the first dog teeth 110, for a particular relative angular velocity. It is understood that the control module 30 can use other methods of determining if the first and second dog teeth 110, 120 are in the fourth zone 574 besides a look-up table, such as calculating the relative positions based on equations for example.

Figure 9:
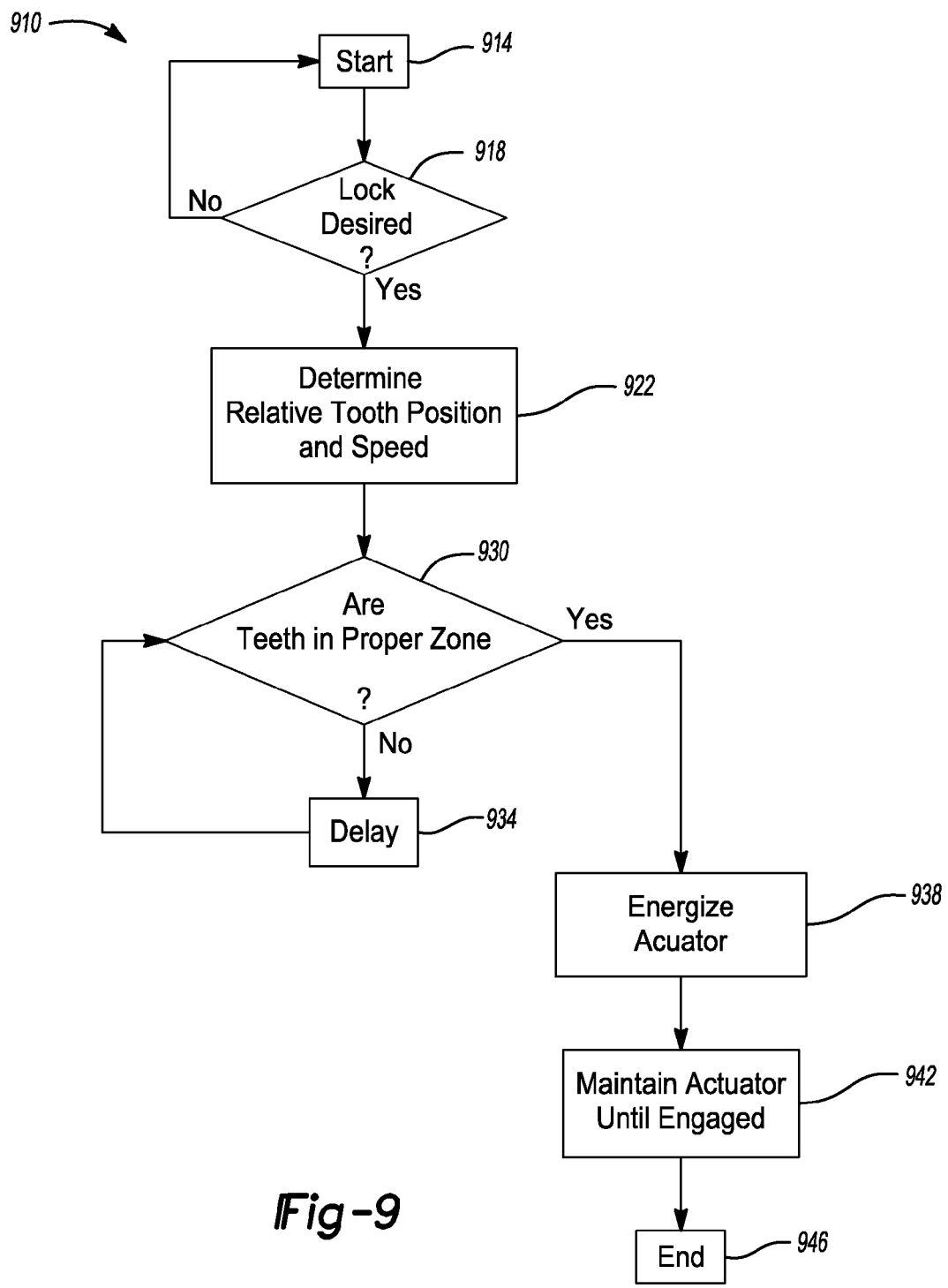
FIG. 9 is a flow chart of a logic routine for operating the engagement of the clutch teeth of the locking differential.

With additional reference to FIG. 9, a logic routine or method 910 that can be used by the control module 30 to operate the actuator 98 is illustrated in flow chart form. The logic routine 910 can minimize or eliminate engagement of the first and second dog teeth 110, 120 in the third and fourth engagement types (FIGS. 7 and 8) and can ensure that engagement only occurs in the first or second engagement types or a desired combination of the first and second engagement types (FIGS. 5 and 6). The logic routine 910 can begin at step 914 and proceed to step 918.

At step 918, the control module 30 (FIGS. 1-4) can receive input from a sensor (e.g. sensors 32 or 34 of FIGS. 1 and 2) of the drivetrain 20 (FIG. 1), input from an operator of the vehicle 6, and/or input from another control system (e.g. a central processing unit; not shown) of the vehicle 6. The input received by the control module 30 can be used to determine that locking of the locking differential assembly 10 is desired. For example, the operator of the vehicle 6 may manually request the locking differential assembly 10 to be in its locked state, or a sensor may indicate that the vehicle's wheels are slipping in a manner that would benefit from the locking differential assembly 10 being locked. If locking the locking differential assembly 10 is not desired, the logic routine 910 can return to step 914. If the control module 30 has determined that locking the locking differential assembly 10 is desired or triggered, the logic routine 910 can proceed to step 922.

At step 922, the control module 30 can receive input from the first and second sensors 32, 34. The control module 30 can determine or calculate the relative angular and axial positions and rotational speeds of the first and second dog teeth 110, 120. After determining the relative angular and axial positions and speeds, the logic routine 910 can proceed to step 930.

At step 930, the control module 30 can determine if the second dog teeth 120 are in either the first or second zones 562, 566 relative to the first dog teeth 110. If the second dog teeth 120 are not in either the first or second zones 562, 566, (e.g. they are in the third or fourth zones 570, 574) then the logic routine 910 can proceed to step 934.

At step 934, the control module 30 can implement a predetermined time delay. The predetermined time delay can be a small amount of time, such as fractions of a second to permit the first and second dog teeth 110, 120 to rotate relative to each other a small amount. The first and second dog teeth 110, 120 can rotate during the time delay such that the second dog teeth 120 can be rotationally closer to the next zone without having passed through the next zone during the time delay. After the time delay, the logic routine 910 can return to step 930.

Returning to step 930, if the control module 30 determines that the second dog teeth 120 are in either the first or second zones 562, 566, then the logic routine 910 can proceed to step 938.

At step 938, the control module 30 can operate the actuator 98 by energizing the electromagnetic coil 150 to axially translate the second locking dog 96. After the control module 30 energizes the electromagnetic coil 150, the logic routine 910 can proceed to step 942.

At step 942, the control module 30 can continue to keep the electromagnetic coil 150 energized until the first and second dog teeth 110, 120 can become engaged in either the first or second engagement types. After the first and second dog teeth 110, 120 are engaged, the logic routine 910 can end at step 946.

With additional reference to FIG. 10, a locking differential assembly 10' of a second construction is illustrated. The locking differential assembly 10' is similar to the locking differential assembly 10 (FIGS. 1-8) except as otherwise shown or described herein. Aspects of the locking differential assembly 10' that are similar to the locking differential assembly 10 are shown and described with similar, but primed reference numerals. Accordingly, the descriptions of these aspects are not repeated, but are incorporated by reference with reference to the locking differential assembly 10'.

In the construction shown in FIG. 10, the second portion 158' of the thrust plate 142' does not include the plurality of first sensor targets 166 (FIGS. 3 and 4) and the first sensor 32' is not mounted to the housing 146' of the annular solenoid 140'. Instead, the first sensor 32' is a variable reluctance sensor that includes the first locking dog 94', the second locking dog 96', the side gear 80', a coil 1010, and a variable reluctance interface circuit ("VRIC") chip 1014.

In this construction, the side gear 80' is at least partially magnetized. The coil 1010 is a coil of electrically conductive wire and in the example provided, is axially aligned with and radially inward of the first portion 156' and the annular body 118'. The coil 1010 is radially disposed about the output portion 86' of the side gear 80'. The coil 1010 is configured such that as the first and second dog teeth 110', 120' come into alignment, a magnetic flux is induced in the coil 1010 to produce a voltage across the coil 1010. The coil 1010 can be electrically coupled to the VRIC chip 1014. The VRIC chip 1014 can be any suitable VRIC circuitry configured to condition (e.g. process or amplify) the electrical signal (e.g. voltage) output from the coil 1010. The VRIC chip 1014 can be electrically coupled to the control module 30' to send the conditioned signal to the control module 30'. Thus, the first sensor 32' provides a voltage output based upon the alignment or dis-alignment (i.e. angular position) of the first and second dog teeth 110', 120'. The locking differential assembly 10' can be operated in the same manner as the locking differential assembly 10 and the control module 30' can operate using the logic routine 910 to prevent engagement of the third or fourth engagement types.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A locking differential assembly comprising:
   a differential case defining a cavity, the differential case being configured to rotate about an axis;
   a differential gearset received in the cavity, the differential gearset having a first side gear configured to rotate about the axis; and
   a locking mechanism for selectively locking the first side gear to the differential case for common rotation about the axis, the locking mechanism including:
      a first locking dog that includes a set of first dog teeth that are fixedly coupled to the first side gear;
      a second locking dog that includes an annular body and a set of second dog teeth, the annular body being coupled to the differential case for common rotation about the axis, the set of second dog teeth extending from the annular body, the second locking dog being movable along the axis between a first position, in which the set of second dog teeth is disengaged from the set of first dog teeth to permit relative rotation between the first side gear and the differential case, and a second position in which the set of second dog teeth is engaged with the set of first dog teeth to inhibit relative rotation between the first side gear and the differential case; and
      an actuator system including at least one sensor and an actuator, the at least one sensor being configured to detect the angular position and angular velocity of the second dog teeth relative to the first dog teeth, the actuator being configured to move the second locking dog from the first position to the second position based on the detected relative angular positions and relative angular velocities of the first and second dog teeth.

2. The locking differential assembly of claim 1, wherein the at least one sensor includes a first sensor configured to detect an angular position of the first dog teeth and a second sensor configured to detect an angular position of the second dog teeth, and wherein the actuator system further includes a control module configured to receive input from the first and second sensors, the control module being configured to determine an angular velocity of the second dog teeth relative to the first dog teeth and an angular position of the second dog teeth relative to the first dog teeth, the control module being configured to activate the actuator based on a predetermined angular position and angular velocity of the second dog teeth relative to the first dog teeth.

3. The locking differential assembly of claim 2, wherein the locking mechanism includes a plurality of second sensor targets coupled for common rotation with the second locking dog, wherein a position of each second sensor target corresponds to a position of a respective one of the second dog teeth and the second sensor is configured to detect the second sensor targets.

4. The locking differential assembly of claim 3, wherein the differential case includes a wall that partially defines the cavity, and the locking mechanism includes a thrust plate, the second locking dog and the thrust plate being disposed on opposite sides of the wall, the plurality of second sensor targets extending radially outward from the thrust plate.

5. The locking differential assembly of claim 3, wherein the locking mechanism includes a plurality of first sensor targets coupled for common rotation with the first side gear, wherein a position of each first sensor target corresponds to a position of a respective one of the first dog teeth and the first sensor is configured to detect the first sensor targets.

6. The locking differential assembly of claim 1, wherein the actuator system is configured to delay moving the second locking dog to the second position until a leading edge of each second dog tooth is located within a predetermined angular distance of a leading edge of a corresponding first dog tooth.

7. The locking differential assembly of claim 1, wherein the at least one sensor includes a variable reluctance sensor that detects the relative angular positions of the first and second dog teeth.

8. The locking differential assembly of claim 7, wherein the variable reluctance sensor includes the first locking dog, the second locking dog, and an electrically conductive coil, the electrically conductive coil being disposed radially between the second locking dog and a portion of the first side gear.

9. A method for operating a locking differential assembly comprising:

detecting a position and rotational speed of a set of first dog teeth of a first locking dog that is coupled for common rotation with a side gear of the locking differential assembly;

detecting a position and rotational speed of a set of second dog teeth of a second locking dog that is coupled for common rotation with a differential case of the locking differential assembly;

determining if the second dog teeth are within a predetermined rotational zone relative to the first dog teeth;

moving the second locking dog axially until the first and second dog teeth are engaged in response to the second dog teeth being detected within the predetermined rotational zone.

10. The method of claim 9, further comprising instituting a delay of a predetermined amount of time in response to the second dog teeth not being within the predetermined rotational zone.

11. The method of claim 10, further comprising determining if the second dog teeth are within the predetermined rotational zone after the delay.

12. The method of claim 9, further comprising moving the second locking dog axially such that an end face of the second dog face contacts a valley between adjacent ones of the first dog teeth before a side face of the second dog teeth contacts a side face of the first dog teeth.

13. An axle assembly comprising:
an axle housing;
a differential assembly housed in the axle housing and rotatable about a rotary axis, the differential assembly including:
  a differential case defining a cavity;
  a differential gearset received in the cavity, the differential gearset having a first side gear;
  a first locking dog that includes a set of first dog teeth that are fixedly coupled to the first side gear; and
  a second locking dog that includes an annular body and a set of second dog teeth, the annular body being coupled to the differential case for common rotation about the rotary axis, the set of second dog teeth extending from the annular body, the second locking dog being movable along the rotary axis between a first position, in which the set of second dog teeth is disengaged from the set of first dog teeth to permit relative rotation between the first side gear and the differential case, and a second position in which the set of second dog teeth is engaged with the set of first dog teeth to inhibit relative rotation between the first side gear and the differential case;
a pair of axle shafts driven by the differential assembly; and
an actuator system including at least one sensor and an actuator, the at least one sensor being configured to detect the angular position and angular velocity of the second dog teeth relative to the first dog teeth, the actuator being configured to move the second locking dog from the first position to the second position based on the detected relative angular positions and relative angular velocities of the first and second dog teeth.

14. The axle assembly of claim 13, wherein the at least one sensor includes a first sensor configured to detect an angular position of the first dog teeth and a second sensor configured to detect an angular position of the second dog teeth, and wherein the actuator system further includes a control module configured to receive input from the first and second sensors, the control module being configured to determine an angular velocity of the second dog teeth relative to the first dog teeth and an angular position of the second dog teeth relative to the first dog teeth, the control module being configured to activate the actuator based on a predetermined angular position and angular velocity of the second dog teeth relative to the first dog teeth.

15. The axle assembly of claim 14, wherein the locking mechanism includes a plurality of second sensor targets coupled for common rotation with the second locking dog, wherein a position of each second sensor target corresponds to a position of a respective one of the second dog teeth and the second sensor is configured to detect the second sensor targets.

16. The axle assembly of claim 15, wherein the differential case includes a wall that partially defines the cavity, and the locking mechanism includes a thrust plate, the second locking dog and the thrust plate being disposed on opposite sides of the wall, the plurality of second sensor targets extending radially outward from the thrust plate.

17. The axle assembly of claim 15, wherein the locking mechanism includes a plurality of first sensor targets coupled for common rotation with the first side gear, wherein a position of each first sensor target corresponds to a position of a respective one of the first dog teeth and the first sensor is configured to detect the first sensor targets.

18. The axle assembly of claim 13, wherein the actuator system is configured to delay moving the second locking dog to the second position until a leading edge of each second dog tooth is located within a predetermined angular distance of a leading edge of a corresponding first dog tooth.

19. The axle assembly of claim 13, wherein the at least one sensor includes a variable reluctance sensor that detects the relative angular positions of the first and second dog teeth.

20. The axle assembly of claim 19, wherein the variable reluctance sensor includes the first locking dog, the second locking dog, and an electrically conductive coil, the electrically conductive coil being disposed radially between the second locking dog and a portion of the first side gear.

* * * * *